(12) United States Patent
Wang et al.

(10) Patent No.: US 12,235,554 B2
(45) Date of Patent: Feb. 25, 2025

(54) DISPLAY SUBSTRATE, DISPLAY PANEL AND DISPLAY APPARATUS

(71) Applicant: BOE Technology Group Co., Ltd., Beijing (CN)

(72) Inventors: Lizhong Wang, Beijing (CN); Ce Ning, Beijing (CN); Dongfang Wang, Beijing (CN); Hui Guo, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/026,489

(22) PCT Filed: Jun. 22, 2022

(86) PCT No.: PCT/CN2022/100511
§ 371 (c)(1),
(2) Date: Mar. 15, 2023

(87) PCT Pub. No.: WO2023/245509
PCT Pub. Date: Dec. 28, 2023

(65) Prior Publication Data
US 2024/0295784 A1    Sep. 5, 2024

(51) Int. Cl.
*G02F 1/1362*    (2006.01)
*G02F 1/1368*    (2006.01)

(52) U.S. Cl.
CPC .. *G02F 1/136286* (2013.01); *G02F 1/136209* (2013.01); *G02F 1/1368* (2013.01)

(58) Field of Classification Search
CPC ............ G02F 1/136286; G02F 1/1368; G02F 1/13685; G02F 1/136209; G02F 1/136227;
(Continued)

(56) References Cited

U.S. PATENT DOCUMENTS

2007/0298554 A1* 12/2007 Long ................. G02F 1/136227
438/160
2010/0045906 A1*  2/2010 Tokuda ............... G02F 1/13394
349/110

(Continued)

FOREIGN PATENT DOCUMENTS

CN        105929607 A     9/2016
CN        205750219 U    11/2016
(Continued)

*Primary Examiner* — Hoan C Nguyen
(74) *Attorney, Agent, or Firm* — IPro, PLLC

(57) ABSTRACT

A display substrate, a display panel and a display apparatus. The display substrate includes a first base substrate; a plurality of gate lines and a plurality of data lines which are arranged on a side of the first base substrate; the plurality of gate lines and the plurality of data lines are arranged to be intersected with each other and insulated from each other; a planarization layer, arranged on a side of the gate lines and the data lines away from the first base substrate, and including a first via hole; and a supporting structure, arranged on a side of the planarization layer away from the first base substrate and filled into the first via hole; and in a direction perpendicular to the first base substrate, a height of the supporting structure is greater than a depth of the first via hole.

13 Claims, 5 Drawing Sheets

(58) Field of Classification Search
CPC .............. G02F 1/1351; G02F 1/1352; G02F 1/136295; G02F 1/13439; G02F 1/136231; H01L 27/124; H01L 27/1222; H10K 59/1213; H10K 59/122; H10K 59/131; H10K 59/126; H10K 59/1216; H10K 59/123; H10K 59/124
See application file for complete search history.

(56) References Cited

U.S. PATENT DOCUMENTS

| | | | |
|---|---|---|---|
| 2019/0056620 A1* | 2/2019 | Akiyoshi | H01L 27/124 |
| 2021/0175259 A1* | 6/2021 | Tai | H10K 59/123 |
| 2021/0181554 A1 | 6/2021 | Hong et al. | |
| 2021/0215981 A1* | 7/2021 | Wang | G02F 1/13439 |
| 2021/0325749 A1* | 10/2021 | Lee | G02F 1/136286 |
| 2023/0099934 A1 | 3/2023 | Gong et al. | |

FOREIGN PATENT DOCUMENTS

| | | |
|---|---|---|
| CN | 107703683 A | 2/2018 |
| CN | 109856841 A | 6/2019 |
| CN | 112992920 A | 6/2021 |
| CN | 111725324 B | 11/2021 |
| CN | 113745246 A | 12/2021 |
| CN | 114068590 A | 2/2022 |
| EP | 1918765 A2 | 5/2008 |
| JP | 2020042104 A | 3/2020 |

\* cited by examiner

DISPLAY SUBSTRATE, DISPLAY PANEL AND DISPLAY APPARATUS

CROSS REFERENCE TO RELATED APPLICATIONS

The present disclosure is a national phase entry under 35 U.S.C § 371 of International Application No. PCT/CN2022/100511, filed Jun. 22, 2022, and entitled "DISPLAY SUBSTRATE, DISPLAY PANEL AND DISPLAY APPARATUS".

FIELD

The present disclosure relates to the field of display, in particular to a display substrate, a display panel and a display apparatus.

BACKGROUND

A liquid crystal display (LCD) has the advantages of light weight, low power consumption, high image quality, low radiation, easy carrying and the like, and it has gradually replaced a traditional cathode ray tube (CRT) display and is widely applied to modern information devices, such as a virtual reality (VR) headworn display device, a laptop, a television, a mobile phone and a digital product.

SUMMARY

Embodiments of the present disclosure provide a display substrate, a display panel and a display apparatus, and a specific solution is as follows.

In an aspect, the embodiments of the present disclosure provides a display substrate, including:
- a first base substrate;
- a plurality of gate lines and a plurality of data lines, arranged on a side of the first base substrate; the plurality of gate lines and the plurality of data lines are arranged to be intersected with each other and insulated from each other;
- a planarization layer, arranged on a side of the plurality of gate lines and the plurality of data lines away from the first base substrate, and including a first via hole; and
- a supporting structure, arranged on a side of the planarization layer away from the first base substrate and filling the first via hole, and in a direction perpendicular to the first base substrate, a height of the supporting structure is greater than a depth of the first via hole.

In some embodiments, in the above display substrate provided by the embodiments of the present disclosure, a surface of a side of the supporting structure away from the first base substrate is a first surface, the first surface is of a curved-surface structure, a vertical height difference range between a maximum distance and a minimum distance between the first surface and the first base substrate is a, and (<|a|≤1 µm.

In some embodiments, in the above display substrate provided by the embodiments of the present disclosure, orthographic projections of the plurality of gate lines on the first base substrate and orthographic projections of the plurality of data lines on the first base substrate have a plurality of overlapping regions, and at least part of the overlapping regions are respectively located in an orthographic projection of a corresponding first via hole on the first base substrate.

In some embodiments, the above display substrate provided by the embodiments of the present disclosure further includes a first light-shielding structure arranged between a layer where the plurality of gate lines are located and the first base substrate: an orthographic projection of the first light-shielding structure on the first base substrate at least covers the orthographic projection of the first via hole outside a corresponding overlapping region on the first base substrate.

In some embodiments, the above display substrate provided by the embodiments of the present disclosure further includes a first electrode arranged between the planarization layer and a layer where the supporting structure is located, an adapting electrode arranged between the planarization layer and a layer where the data lines are located, and a filling structure arranged on the same layer as the supporting structure; and the planarization layer further includes a second via hole, the first electrode is connected with the adapting electrode through the second via hole, and the filling structure fills the second via hole.

In some embodiments, in the above display substrate provided by the embodiments of the present disclosure, in a cross section perpendicular to the first base substrate, a difference between a maximum radial dimension of the supporting structure and a maximum radial dimension of the filling structure is greater than or equal to 0 µm and smaller than or equal to 5 µm.

In some embodiments, in the above display substrate provided by the embodiments of the present disclosure, in the cross section perpendicular to the first base substrate, a difference between a maximum radial dimension of the first via hole and a maximum radial dimension of the second via hole is greater than or equal to 2 µm and smaller than or equal to 9 µm.

In some embodiments, in the above display substrate provided by the embodiments of the present disclosure, in the direction perpendicular to the first base substrate, the depth of the first via hole is greater than a depth of the second via hole.

In some embodiments, in the above display substrate provided by the embodiments of the present disclosure, in the cross section perpendicular to the first base substrate, a shortest distance $S_1$ between the first via hole and the second via hole is greater than or equal to 2 µm and smaller than or equal to 5 µm, and a longest distance $S_2$ between the first via hole and the second via hole is equal to $(S_1 + h_1 * \cot \beta + h_2 * \cot \gamma)$, where $h_1$ is the depth of the first via hole in the direction perpendicular to the first base substrate, $\beta$ is an angle of gradient of the planarization layer at the first via hole, $h_2$ is the depth of the second via hole in the direction perpendicular to the first base substrate, and $\gamma$ is an angle of gradient of the planarization layer at the second via hole.

In some embodiments, the above display substrate provided by the embodiments of the present disclosure further includes a transistor arranged between a layer where the adapting electrode is located and the first base substrate: the transistor includes a gate, and at least part of an orthographic projection of the second via hole on the first base substrate is located in an orthographic projection of the gate on the first base substrate.

In some embodiments, the above display substrate provided by the embodiments of the present disclosure further includes a second light-shielding structure arranged between a layer where the gate is located and the first base substrate; and the transistor includes an active layer disposed between the layer where the gate is located and a layer where the second light-shielding structure is located, the active layer includes a channel region, and an orthographic projection of the channel region on the first base substrate is located in an orthographic projection of the second light-shielding structure on the first base substrate.

In some embodiments, in the above display substrate provided by the embodiments of the present disclosure, the first light-shielding structure and the second light-shielding structure are arranged on the same layer, the first light-shielding structure and the second light-shielding structure are independent of each other, or one first light-shielding structure and an adjacent second light-shielding structure are integrated.

In some embodiments, the above display substrate provided by the embodiments of the present disclosure further includes a connecting structure arranged on the same layer as the supporting structure and the filling structure, and the connecting structure is arranged between the supporting structure and the filling structure and is integrated with the supporting structure and the filling structure; and a distance between a surface of a side of the connecting structure away from the first base substrate and the first base substrate is greater than a distance between a surface of a side of the supporting structure or the filling structure away from the first base substrate and the first base substrate.

In some embodiments, the above display substrate provided by the embodiments of the present disclosure further includes a second electrode located on a side, away from the planarization layer, of the layer where the first electrode is located.

In another aspect, the embodiments of the present disclosure provides a display panel, including: a display substrate and an opposite substrate which are arranged oppositely, the display substrate is the above display substrate provided by the embodiments of the present disclosure, the opposite substrate includes a second base substrate, and a spacer located on a side of the second base substrate facing the display substrate, and an end of a side of the spacer facing the display substrate is arranged in a concave portion of the supporting structure.

In another aspect, the embodiments of the present disclosure provide a display apparatus, including the above display panel provided by the embodiments of the present disclosure.

DETAILED DESCRIPTION OF THE EMBODIMENTS

Figure 1:
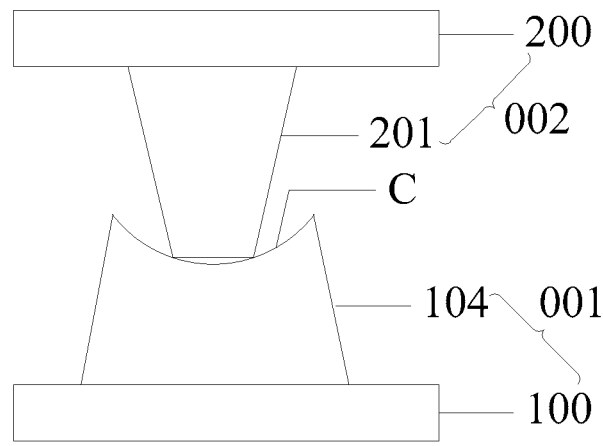
FIG. 1 is a schematic structural diagram of a display panel provided by an embodiment of the present disclosure.

To make objectives, technical solutions and advantages of embodiments of the present disclosure clearer, the technical solutions of the embodiments of the present disclosure will be clearly and completely described below in conjunction with accompanying drawings of the embodiments of the present disclosure. It needs to be noted that sizes and shapes of all figures in the accompanying drawings do not reflect true scales, and are only intended to schematically illustrate the content of the present disclosure. The same or similar reference numerals represent the same or similar elements or elements with the same or similar functions all the time. In order to keep the following descriptions of the embodiments of the present disclosure clear and concise, detailed descriptions of known functions and known components are omitted.

Unless otherwise defined, technical or scientific terms used herein shall have the ordinary meanings understood by those ordinarily skilled in the art to which the present disclosure pertains. The words "first", "second" and the similar words used in specification and claims of the present disclosure do not indicate any order, quantity or importance, but are only used to distinguish different components. The words "comprise" or "include" and the like indicate that an element or item appearing before such the words covers listed elements or items appearing after the words and equivalents thereof, and do not exclude other elements or items. "Inner", "outer", "upper", "lower" and the like are only used to represent relative position relationships, and the relative position relationships may also change accordingly after an absolute position of a described object is changed.

A related liquid crystal display panel includes a display substrate and an opposite substrate which are arranged oppositely, a spacer is arranged on a side of the opposite substrate facing the display substrate, and a supporting structure for supporting the spacer is arranged on a side of the display substrate facing the opposite substrate. Since the spacer occupies part of a space between the display substrate and the opposite substrate for arranging a liquid crystal layer, which is equivalent to absence of the liquid crystal layer at a position of the spacer, the position of the spacer may not be driven by an electric field, so as to realize a light transmission effect or a light shielding effect. In order to avoid the impact of the spacer on the display, it is usually necessary to adopt a black matrix to block the spacer, thereby reducing a pixel aperture ratio. With continuous improvement of a product resolution (PPI), the impact of the spacer on the pixel aperture ratio gradually increases. In order to meet the demand of the pixel aperture ratio, a dimension of the spacer is gradually reduced, and the corresponding supporting structure is also gradually reduced. However, a contact surface between the supporting structure and the spacer is a flat surface, which causes that a small spacer is prone to sliding out of the supporting structure and scratching an orientation layer (PI) near the supporting structure, resulting in a phenomenon of light leakage.

Figure 3:
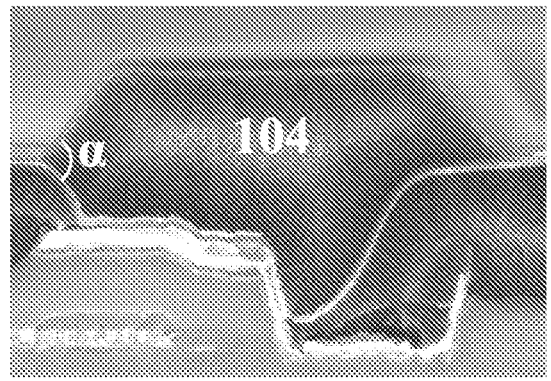
FIG. 3 is an electron microscope view of a supporting structure provided by an embodiment of the present disclosure.
Figure 4:
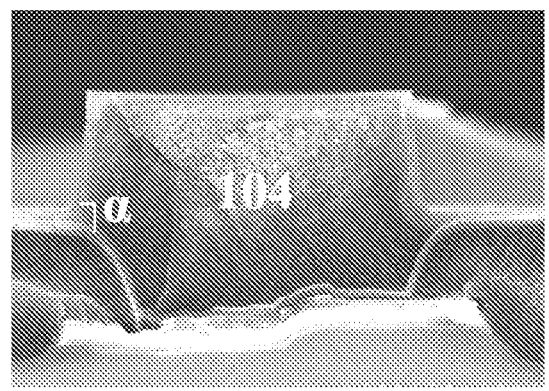
FIG. 4 is another electron microscope view of a supporting structure provided by an embodiment of the present disclosure.

In order to solve the above technical problems existing in the related art, embodiments of the present disclosure provide a display substrate, as shown in FIG. 1 to FIG. 6, including:

a first base substrate 100;

a plurality of gate lines 101 and a plurality of data lines 102, which are arranged on a side of the first base substrate 100, wherein the plurality of gate lines 101 and the plurality of data lines 102 are arranged to be intersected with each other and insulated from each other;

a planarization layer 103, arranged on a side of the gate lines 101 and the data lines 102 away from the first base substrate 100, and including a first via hole $V_1$; and a supporting structure 104, arranged on a side of the planarization layer 103 away from the first base substrate 100 and filled into the first via hole $V_1$, such that a surface of the side of the supporting structure 104 away from the first base substrate 100 has a concave portion C, where in a direction Z perpendicular to the first base substrate 100, a height H of the supporting structure 104 is greater than a depth $h_1$ of the first via hole $V_1$, and the concave portion C may limit sliding of a spacer 201. Optionally, in order to ensure that the supporting structure 104 has a good stability and is not prone to toppling or falling off, so as to better support the spacer 201, the supporting structure 104 may have a structure with a narrow top and a wide bottom, as shown in FIG. 3, an angle of gradient a of the supporting structure 104 may be greater than or equal to an acute angle of 40°: or as shown in FIG. 4, the supporting structure 104 is a structure with the same width from up to down, and the angle of gradient a of the supporting structure 104 is 90°, which is equivalent to that the supporting structure 104 is arranged perpendicular to the first base substrate 100. Optionally, the height H of the supporting structure 104 may be greater than or equal to 0.5 μm and smaller than or equal to 3 μm, such as 0.5 μm, 1 μm, 1.5 μm, 2 μm, 2.5 μm and 3 μm.

In the above display substrate provided by the embodiments of the present disclosure, the supporting structure 104 fills the first via hole $V_1$ of the planarization layer 103, so that the surface of the side of the supporting structure 104 away from the first base substrate 100 has the concave portion C, sliding of the spacer 201 is limited by the concave portion C, it is ensured that an end of the spacer 201 facing the display substrate 001 is limited into the concave portion C, and the problem of light leakage caused by sliding of the spacer 201 out of the supporting structure 104 can be solved.

Figure 2:
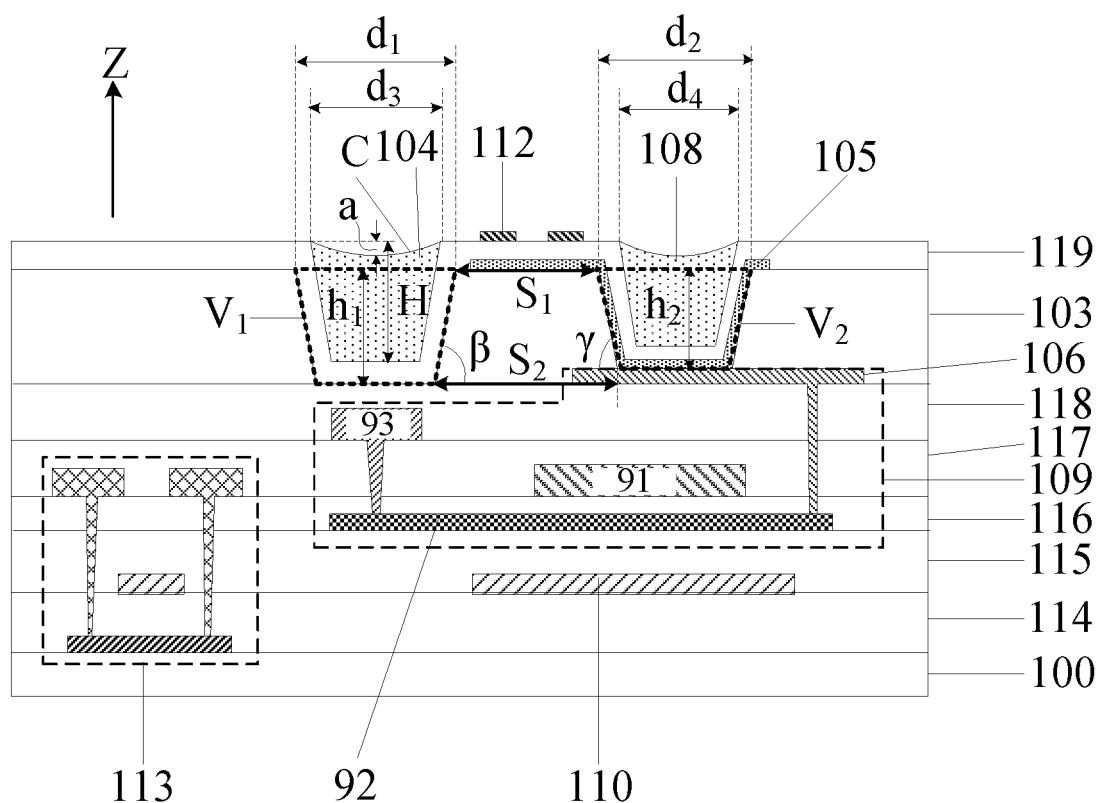
FIG. 2 is a schematic structural diagram of a display substrate provided by an embodiment of the present disclosure.
Figure 5:
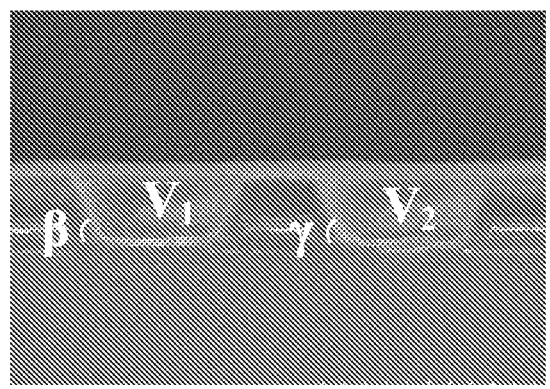
FIG. 5 is an electron microscope view of a planarization layer provided by an embodiment of the present disclosure.

In some embodiments, as shown in FIG. 2 and FIG. 5, the planarization layer 103 is provided with a second via hole $V_2$ for connecting a first electrode 105 and an adapting electrode 106, the first via hole $V_1$ in the present disclosure may be formed by a single mask patterning process with the second via hole $V_2$, therefore, a process flow may be simplified, and a production cost is reduced. Of course, in some embodiments, the surface of the side of the supporting structure 104 away from the first base substrate 100 may also be processed separately to form the concave portion C, which is not limited here. Optionally, a thickness of the planarization layer 103 is greater than or equal to 1 μm and the thickness of the planarization layer 103 is smaller than or equal to 2 μm (such as 1 μm, 1.5 μm and 2 μm), and an angle of gradient B of the planarization layer 103 at the first via hole $V_1$ and an angle of gradient γ of the planarization layer 103 at the second via hole $V_2$ may be greater than or equal to 60° and smaller than or equal to 80°, such as 60°, 65°, 70°, 75° and 80°.

In some embodiments, in the above display substrate provided by the embodiments of the present disclosure, as shown in FIG. 2, the surface of the side of the supporting structure 104 away from the first base substrate 100 is a first surface, the first surface is of a curved-surface structure, a vertical height difference range between a maximum distance and a minimum distance between the first surface and the first base substrate 100 is a, and 0<|a|≤1 μm. Because the larger the supporting structure 104 is, the larger the first via hole $V_1$ that accommodates the supporting structure 104 is, and the greater the adverse impact on a pixel aperture ratio of a high-resolution product structure is, the dimension of the first via hole $V_1$ cannot be too large. The first surface of the supporting structure 104 in the present disclosure is set to be of the curved-surface structure, and a value of a is controlled within 1 μm, which can not only realize a small area occupied by the first via hole $V_1$, but also ensure to limit the sliding of the spacer 201.

Optionally, the curved-surface structure may be an inward-concave structure formed by the concave portion C shown in FIG. 2, so that the end of the spacer 201 facing the display substrate 001 is limited in the concave portion C. Alternatively, the curved-surface structure is an outward-convex structure that arches in a direction away from the first base substrate 100, correspondingly, the end of the spacer 201 facing the display substrate 001 may be of a concave structure adapted to the outward-convex structure, so that the outward-convex structure of the supporting structure 104 is limited in the concave structure of the spacer 201, and effective supporting and limiting of the spacer 201 is realized.

Figure 6:
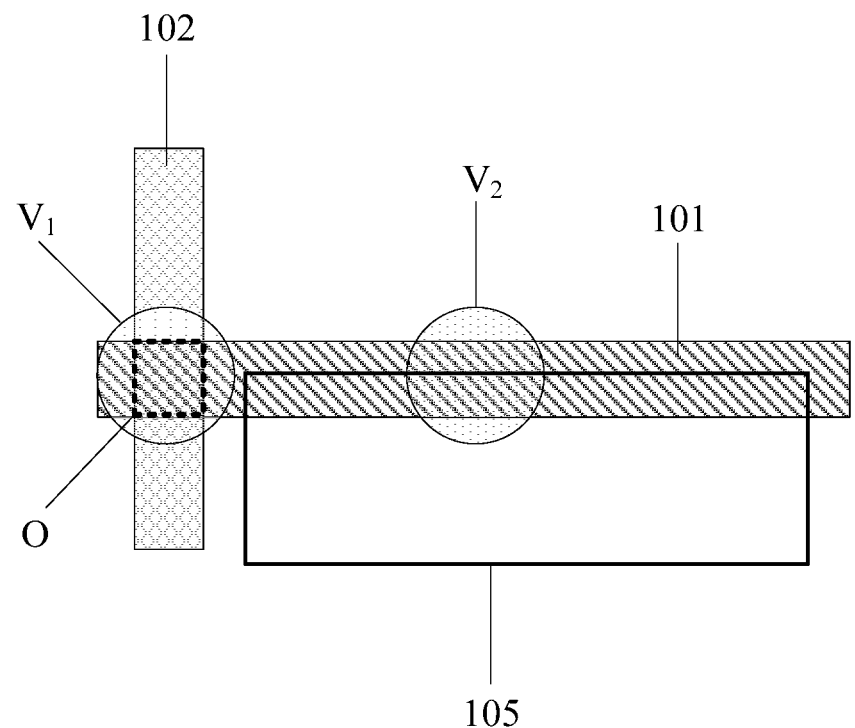
FIG. 6 is another schematic structural diagram of a display substrate provided by an embodiment of the present disclosure.

In some embodiments, in the above display substrate provided by the embodiments of the present disclosure, as shown in FIG. 2 and FIG. 6, orthographic projections of the plurality of gate lines 101 on the first base substrate 100 and orthographic projections of the plurality of data lines 102 on the first base substrate 100 have a plurality of overlapping regions O, and at least part of the overlapping regions O are respectively located in an orthographic projection of a corresponding first via hole $V_1$ on the first base substrate 100. Exemplarily, FIG. 6 only shows a gate line 101 and a data line 102, and an overlapping region O of the orthographic projections of the gate line 101 and the data line 102. The first via hole $V_1$ is formed at a position where the overlapping region O is located, so that the gate line 101 and the data line 102 which may pass through the overlapping region O have a light shielding effect on the first via hole $V_1$ at the same time in an extension direction of the gate line 101 and an extension direction of the data line 102, to reduce light leakage, and to improve the quality of products.

It should be noted that the supporting structure 104 is embedded in the first via hole $V_1$ and is configured to support the spacer 201, and therefore, an arrangement mode of the first via hole $V_1$ may be equivalent to an arrangement mode of the spacer 201. In order to facilitate maintenance of a cell gap uniformity of the liquid crystal display panel, the first via hole $V_1$ should be uniformly distributed (equivalent to the uniform distribution of the spacer 201), and the quantity may not be specifically limited. For example, the total quantity of the first via hole $V_1$ may be smaller than the total quantity of the overlapping regions O. In addition, in the related art, the spacer 201 is arranged in a pixel opening region, resulting in a decrease of the pixel aperture ratio. In the present disclosure, the spacer 201 is arranged in the overlapping regions O, which prevents the spacer 201 from occupying the pixel opening region, and can improve the pixel aperture ratio.

Figure 7:
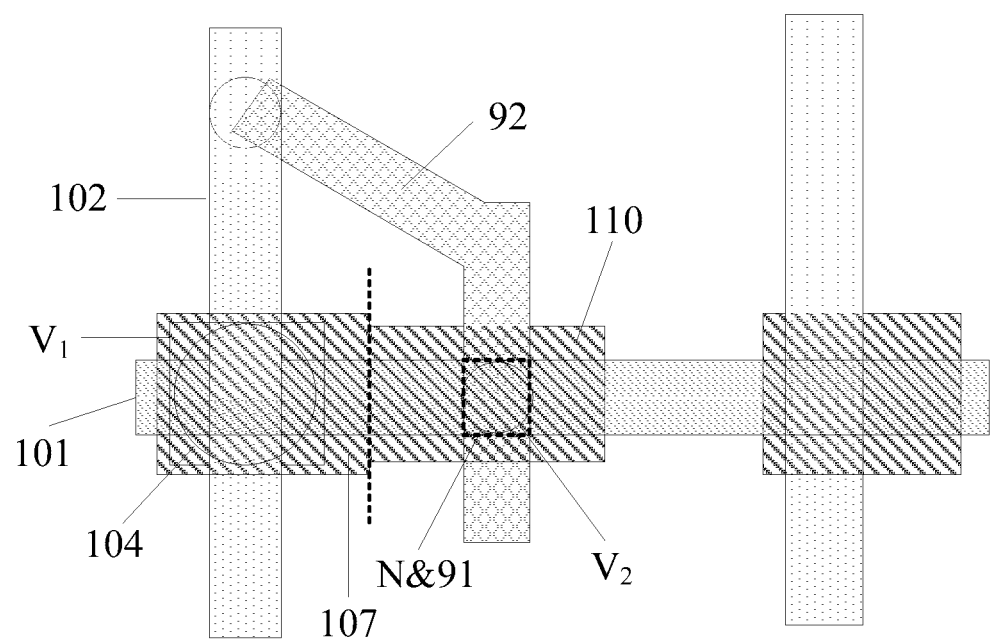
FIG. 7 is yet another schematic structural diagram of a display substrate provided by an embodiment of the present disclosure.

In some embodiments, the above display substrate provided by the embodiments of the present disclosure, as shown in FIG. 2 and FIG. 7, may further include a first light-shielding structure 107 arranged between a layer where the gate lines 101 (the gate lines 101 are arranged on the same layer as a gate 91) and the first base substrate 100, and an orthographic projection of the first light-shielding structure 107 on the first base substrate 100 at least covers the orthographic projection of the first via hole $V_1$ outside the overlapping regions O on the first base substrate 100. By adopting the first light-shielding structure 107 to at least shield an region of the first via hole $V_1$ outside the overlapping regions O, the first light-shielding structure 107, the gate lines 101 and the data lines 102 jointly shield backlight to avoid light leakage at the first via hole $V_1$.

Optionally, in order to facilitate the production of the first light-shielding structure 107, it may be set that the orthographic projection of the first light-shielding structure 107 on the first base substrate 100 covers the orthographic projection of the first via hole $V_1$ on the first base substrate 100, that is, an area of the orthographic projection of the first light-shielding structure 107 on the first base substrate 100 is greater than or equal to an area of the orthographic projection of the first via hole $V_1$ on the first base substrate 100, in other words, the orthographic projection of the first via hole $V_1$ on the first base substrate 100 is located in the orthographic projection of the first light-shielding structure 107 on the first base substrate 100, or the orthographic projection of the first via hole $V_1$ on the first base substrate 100 coincides with the orthographic projection of the first light-shielding structure 107 on the first base substrate 100. In some embodiments, in order to prevent too large first light-shielding structure 107 from causing great sacrifice to the pixel aperture ratio, optionally, a distance between a boundary of the orthographic projection of the first via hole $V_1$ on the first base substrate 100 and a boundary of the orthographic projection of the first light-shielding structure 107 on the first base substrate 100 may be greater than or equal to 0 μm and smaller than or equal to 5 μm, such as 0 μm, 0.5 μm, 1 μm, 1.5 μm, 2 μm, 2.5 μm, 3 μm, 3.5 μm, 4 μm, 4.5 μm and 5 μm.

In some embodiments, in the above display substrate provided by the embodiments of the present disclosure, as shown in FIG. 2, a filling structure 108 may be arranged at a second via hole $V_2$ for connecting the first electrode 105 and the adapting electrode 106 in the planarization layer 103, so as to improve flatness at the second via hole $V_2$. Optionally, the filling structure 108 and the supporting structure 104 may be arranged on the same layer, so that the same film layer may be adopted, and the filling structure 108 and the supporting structure 104 are formed in combination with a single mask patterning process.

In some embodiments, in the display substrate provided by the embodiments of the present disclosure, as shown in FIG. 2, in the cross section perpendicular to the first base substrate 100, a maximum radial dimension d3 of the supporting structure 104 may be greater than or equal to a maximum radial dimension d4 of the filling structure 108, so as to improve an alignment margin of a mask for producing the supporting structure 104 and the filling structure 108 and the display substrate. It is easy to understand that the larger the supporting structure 104 is, the larger the first via hole $V_1$ that accommodates the supporting structure 104 is, and the larger the first light-shielding structure 107 needs to be arranged to shield the backlight, and the light leakage of the first via hole $V_1$ is prevented, which is inconducive to improvement of the pixel aperture ratio. Therefore, the dimension of the supporting structure 104 may be reasonably increased on the basis of the filling structure 108, optionally, a difference between the maximum radial dimension d3 of the supporting structure 104 and the maximum radial dimension d4 of the filling structure 108 may be greater than or equal to 0 μm and smaller than or equal to 5 μm, such as 0 μm, 0.5 μm, 1 μm, 1.5 μm, 2 μm, 2.5 μm, 3 μm, 3.5 μm, 4 μm, 4.5 μm and 5 μm.

In some embodiments, in the above display substrate provided by the embodiments of the present disclosure, as shown in FIG. 2, in the cross section perpendicular to the first base substrate 100, a difference between the maximum radial dimension $d_1$ of the first via hole $V_1$ and the maximum radial dimension $d_2$ of the second via hole $V_2$ (that is $d_1$-$d_2$) may be greater than or equal to 2 μm and smaller than or equal to 9 μm, for example, it may be 2 μm, 3 μm, 4 μm, 5 μm, 6 μm, 7 μm, 8 μm, 9 μm and the like. By reasonably increasing the first via hole $V_1$ based on the second via hole $V_2$, a large supporting structure 104 may be arranged in a large first via hole $V_1$, to effectively support the spacer 201 and limit the sliding, and further ensure that the impact on the pixel aperture ratio is small.

In some embodiments, in the above display substrate provided by the embodiments of the present disclosure, as shown in FIG. 2, in the direction Z perpendicular to the first base substrate 100, the depth $h_1$ of the first via hole $V_1$ is greater than a depth $h_2$ of the second via hole $V_2$. Optionally, a difference between the depth $h_1$ of the first via hole $V_1$ and the depth $h_2$ of the second via hole $V_2$ (that is $h_1$-$h_2$) may be equal to a thickness of the adapting electrode 106 in the direction Z perpendicular to the first base substrate 100.

In some embodiments, in the above display substrate provided by the embodiments of the present disclosure, as shown in FIG. 2, in the cross section perpendicular to the first base substrate 100, a shortest distance $S_1$ between the first via hole $V_1$ and the second via hole $V_2$ is greater than or equal to 1.5 μm and smaller than or equal to 5 μm, such as 1.5 μm, 2 μm, 2.5 μm, 3 μm, 3.5 μm, 4 μm, 4.5 μm and 5 μm, and a longest distance $S_2$ between the first via hole $V_1$ and the second via hole $V_2$ is equal to $(S_1 + h_1 * \cot \beta + h_2 * \cot \gamma)$, where $h_1$ is the depth of the first via hole $V_1$ in the direction Z perpendicular to the first base substrate 100, β is an angle of gradient of the planarization layer 103 at the first via hole $V_1$, $h_2$ is the depth of the second via hole $V_2$ in the direction Z perpendicular to the first base substrate 100, and γ is an angle of gradient of the planarization layer 103 at the second via hole $V_2$.

Optionally, a first via hole $V_1$ and a second via hole $V_2$ may be arranged at the same time in the range of a sub-pixel pitch, and in a structure of a high-resolution product, in order to make full use of a space of the sub-pixels, it may be set that a sum of the maximum radial dimension $d_1$ of the first via hole $V_1$, the maximum radial dimension $d_2$ of the second via hole $V_2$ and the shortest distance $S_1$ between the first via hole $V_1$ and the second via hole $V_2$ (that is, $d_1 + d_2 + S_1$) is equal to a dimension of a sub-pixel on a connecting line between a center of the first via hole $V_1$ and a center of the second via hole $V_2$. It should be understood that in a low-resolution product, since there is an enough space to arrange the first via hole $V_1$ and the second via hole $V_2$, the sum of the maximum radial dimension $d_1$ of the first via hole $V_1$, the maximum radial dimension $d_2$ of the second via hole $V_2$ and the shortest distance $S_1$ between the first via hole $V_1$ and the second via hole $V_2$ (that is, $d_1+d_2+S_1$) may be smaller than the dimension of the sub-pixel on the connecting line between the center of the first via hole $V_1$ and the center of the second via hole $V_2$.

In some embodiments, the above display substrate provided by the embodiments of the present disclosure, as shown in FIG. 2 and FIG. 7, may further include a transistor 109 arranged between a layer where the adapting electrode 106 is located and the first base substrate 100, wherein the transistor 109 includes a gate 91, and the orthographic projection of the second via hole $V_2$ on the first base substrate 100 is located in an orthographic projection of the gate 91 on the first base substrate 100, so as to shield backlight through the gate 91 to avoid the light leakage of the second via hole $V_2$. Of course, in some embodiments, as shown in FIG. 6, the orthographic projection of the second via hole $V_2$ on the first base substrate 100 may also partially overlap the orthographic projection of the gate 91 on the first base substrate 100, which is not limited here.

In some embodiments, the above display substrate provided by the embodiments of the present disclosure, as shown in FIG. 2 and FIG. 7, may further include a second light-shielding structure 110 arranged between a layer where the gate 91 is located and the first base substrate 100, the transistor 109 includes an active layer 92 disposed between the layer where the gate 91 is located and a layer where the second light-shielding structure 110 is located, the active layer 92 includes a channel region N, and an orthographic projection of the channel region N on the first base substrate 100 is located in an orthographic projection of the second light-shielding structure 110 on the first base substrate 100, so as to shield the backlight through the second light-shielding structure 110 to prevent the backlight from irradiating the channel region N and affecting the stability of the transistor 109.

Optionally, in order to realize that the second light-shielding structure 110 effectively prevents the backlight from irradiating the channel region N while taking into account the large pixel aperture ratio, a distance between a boundary of the orthographic projection of the second light-shielding structure 110 on the first base substrate 100 and a boundary of the orthographic projection of the channel region N on the first base substrate 100 may be greater than or equal to 0.5 μm and smaller than or equal to 5 μm, such as 0.5 μm, 1 μm, 1.5 μm, 2 μm, 2.5 μm, 3 μm, 3.5 μm, 4 μm, 4.5 μm and 5 μm.

In some embodiments, the channel region N and the gate 91 may be arranged directly facing each other up and down, that is, an area of the orthographic projection of the channel region N on the first base substrate 100 is the same as an area of the orthographic projection of the gate 91 on the first base substrate 100. Therefore, in the extension direction of the data lines 102, a distance between the boundary of the orthographic projection of the second light-shielding structure 110 on the first base substrate 100 and a boundary of the orthographic projection of the gate 91 on the first base substrate 100 may also be greater than or equal to 0.5 μm and smaller than or equal to 5 μm, such as 0.5 μm, 1 μm, 1.5 μm, 2 μm, 2.5 μm, 3 μm, 3.5 μm, 4 μm, 4.5 μm and 5 μm. Optionally, a part that the gate lines 101 directly faces the channel region N up and down is taken as the gate 91 for use.

Figure 8:
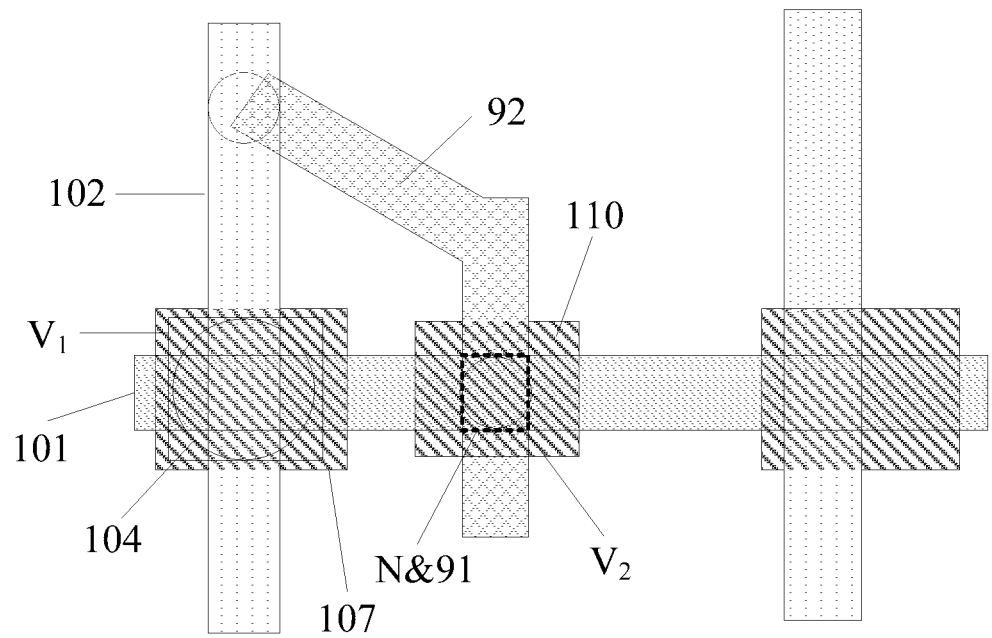
FIG. 8 is yet another schematic structural diagram of a display substrate provided by an embodiment of the present disclosure.

In some embodiments, in the above display substrate provided by the embodiments of the present disclosure, as shown in FIG. 7 and FIG. 8, in order to reduce the quantity of the patterning process and the film layers, the second light-shielding structure 110 and the first light-shielding structure 107 may be arranged on the same layer, the second light-shielding structure 110 and the first light-shielding structure 107 may be independent of each other, or one second light-shielding structure 110 and an adjacent first light-shielding structure 107 are integrated. In some embodiments, the adjacent second light-shielding structure 110 and the first light-shielding structure 107 are located in the same pixel region.

Figure 9:
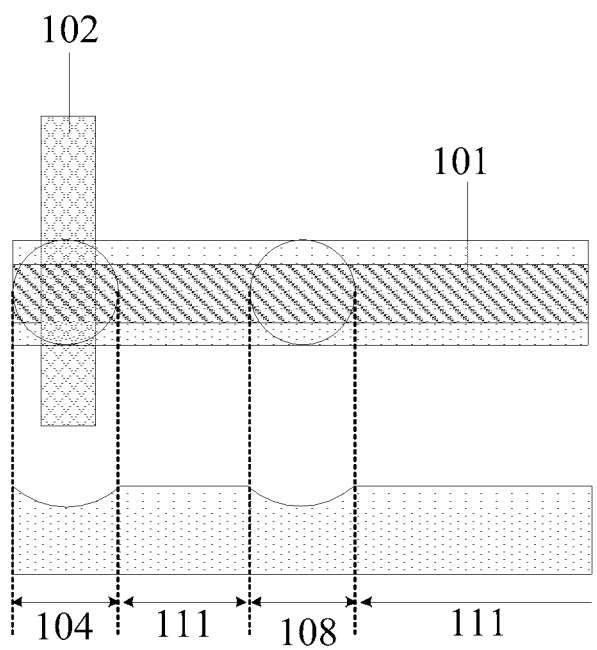
FIG. 9 is yet another schematic structural diagram of a display substrate provided by an embodiment of the present disclosure.

In some embodiments, the above display substrate provided by the embodiments of the present disclosure, as shown in FIG. 9, may further include a connecting structure 111 arranged on the same layer as the supporting structure 104 and the filling structure 108, the connecting structure 111 is located between the supporting structure 104 and the filling structure 108, and the connecting structure 111 is integrated with the supporting structure 104 and the filling structure 108, so that the supporting structure 104, the connecting structure 111 and the filling structure 108 form a strip-shaped structure. Optionally, an extension direction of the strip-shaped structure is the same as the extension direction of the gate lines 101. Since there is the first via hole $V_1$ under the supporting structure 104 and the second via hole $V_2$ under the filling structure 108, surfaces of a side of the supporting structure 104 and a side of the filling structure 108 away from the first base substrate 100 may be slightly concave due to the existence of the via holes, so that a distance between the surface of the side of the connecting structure 111 away from the first base substrate 100 and the first base substrate 100 is greater than a distance between the surface of the side of the supporting structure 104 or the filling structure 108 away from the first base substrate 100 and the first base substrate 100. Optionally, compared with the surface of the side of the connecting structure 111 away from the first base substrate 100, the surface of the side of the supporting structure 104 or the filling structure 108 away from the first base substrate 100 is slightly lowered by 0.1 μm-0.5 μm, such as 0.1 μm, 0.2 μm, 0.3 μm, 0.4 μm and 0.5 μm.

In some embodiments, the above display substrate provided by the embodiments of the present disclosure, as shown in FIG. 2, may further include a second electrode 112 located on a side, away from the planarization layer 103, of a layer where the first electrode 105 is located, and an orthographic projection of the second electrode 112 on the first base substrate 100 at least partially overlaps the orthographic projection of the first electrode 105 on the first base substrate 100. Optionally, the first electrode 105 is a pixel electrode, the second electrode 112 is a common electrode, and the common electrode may be a slit-shaped electrode.

In some embodiments, in the above display substrate provided by the embodiments of the present disclosure, as shown in FIG. 2, the adapting electrode 106 is electrically connected with the active layer 92 of the transistor 109. Optionally, a material of the active layer 92 may be metal oxides, such as any one or more of indium gallium zinc oxide (IGZO), amorphous or polycrystalline zinc oxide (ZnO), indium zinc oxide (IZO), zinc oxide (ZTO), zinc-tin oxide (IZTO), gallium zinc oxide (IGZTO) or indium gallium oxide (IGO), and in order to improve transmittance, a material of the adapting electrode 106 may be transparent conductive oxides, such as indium tin oxide (ITO) and indium tin oxide (IZO). In addition, as shown in FIG. 2, in the present disclosure, a polysilicon transistor with a top gate structure may further included, and the first light-shielding structure 107 and the second light-shielding structure 110 may be arranged on the same layer as a gate of the polysilicon transistor.

In some embodiments, the above display substrate provided by the embodiments of the present disclosure, as shown in FIG. 2, may further include a first gate insulating layer 114, a first interlayer dielectric layer 115, a second gate insulating layer 116, a second interlayer dielectric layer 117, a first insulating layer 118, a second insulating layer 119 and the like. Other essential components of the display substrate should be understood by those ordinarily skilled in the art, and are not repeated here, nor should it be used as a limitation to the present disclosure.

Based on the same inventive concept, the embodiments of the present disclosure further provides a display panel, as shown in FIG. 1, including: a display substrate 001 and an opposite substrate 002 which are arranged oppositely, the display substrate 001 is the above display substrate 001 provided by the embodiments of the present disclosure, the opposite substrate 002 includes a second base substrate 200 and a spacer 201 located on a side of the second base substrate 200 facing the display substrate 001, and an end of a side of the spacer 201 facing the display substrate 001 is arranged in a concave portion C, so that the spacer 201 is not prone to sliding out of a supporting structure 104 due to a limitation effect of the concave portion C.

Figure 10:
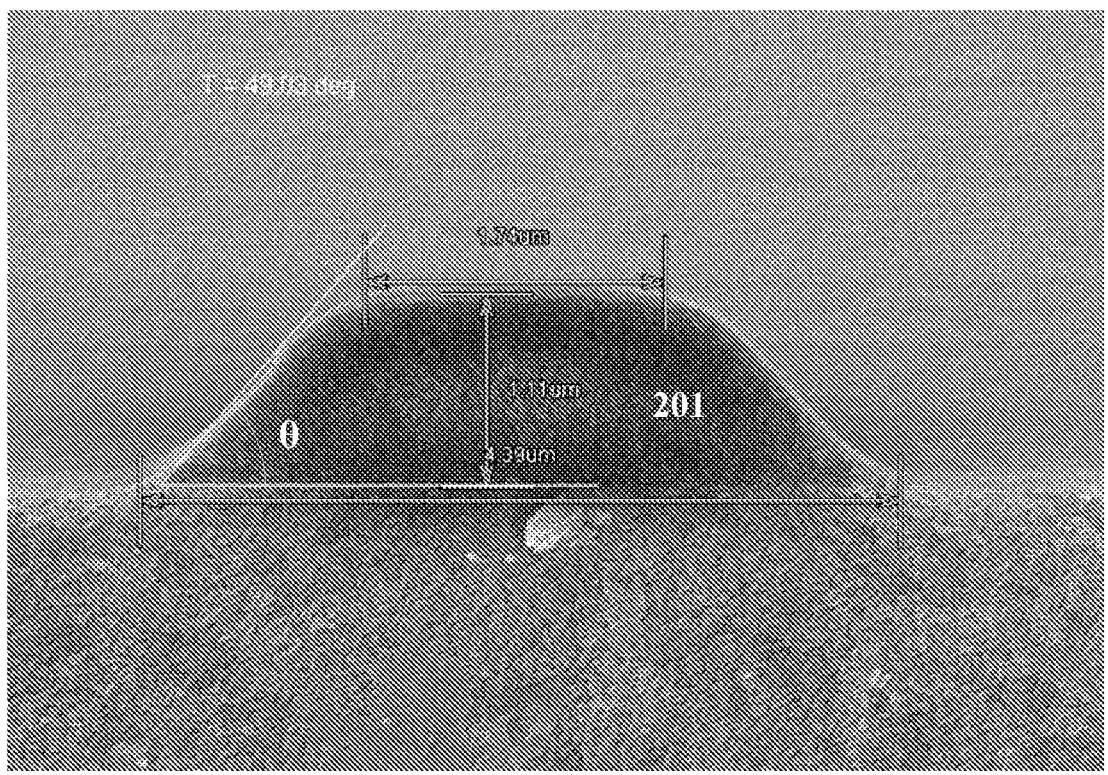
FIG. 10 is an electron microscope view of a spacer provided by an embodiment of the present disclosure.

In some embodiments, as shown in FIG. 10, an angle of gradient 0 of the spacer 201 is greater than or equal to 40° and smaller than or equal to 90°, such as 40°, 45°, 50°, 55°, 60°, 65°, 70°, 75°, 80°, 85° and 90°. A height of the spacer 201 is greater than or equal to 0.5 μm and smaller than or equal to 2 μm, such as 0.5 μm, 1 μm, 1.5 μm and 2 μm.

In some embodiments, the above display panel provided by the embodiments of the present disclosure may be a liquid crystal display panel. The liquid crystal display panel may further include a liquid crystal layer located between the display substrate 001 and the opposite substrate 002. Optionally, in the present disclosure, a situation that the first electrode 105 and the second electrode 112 are both arranged on the display substrate 001 is taken as an example for illustration, and in some embodiments, the second electrode 112 may also be arranged on the opposite substrate 002.

Based on the same inventive concept, the embodiments of the present disclosure further provides a display apparatus, including the above display panel provided by the embodiments of the present disclosure. Since the principle for solving problems of the display apparatus is similar to that of the above display panel, implementation of the display apparatus provided by the embodiments of the present disclosure may refer to implementation of the above display panel, and repetitions will not be made.

In some embodiments, the above display apparatus provided by the embodiments of the present disclosure may be a mobile phone, a tablet, a television, a display, a laptop, a digital photo frame, a navigator, a smart watch, a fitness wristband, a personal digital assistant, a virtual reality (VR) headworn display device and any other products or components with a display function. The display apparatus includes but not limited to: a radio frequency device, a network module, an audio output & input device, a sensor, a display device, a user input device, an interface device, a memory, a processor, a power supply and other components. In addition, those skilled in the art may understand that the above structure does not constitute a limitation of the above display apparatus provided by the embodiments of the present disclosure. In other words, the above display apparatus provided by the embodiments of the present disclosure may include more or less components, or combine some components, or different component arrangements.

Although preferred embodiments have been described in the present disclosure, it should be understood that those skilled in the art may make various modifications and variations to the embodiments of the present disclosure without departing from the spirit and scope of the embodiments of the present disclosure. In this way, under the condition that these modifications and variations to the embodiments of the present disclosure fall within the scope of the claims of the present disclosure and their equivalent technologies, the present disclosure is also intended to include these modifications and variations.

What is claimed is:

1. A display substrate, comprising:
a first base substrate;
a plurality of gate lines and a plurality of data lines, arranged on a side of the first base substrate, wherein the plurality of gate lines and the plurality of data lines are arranged to be intersected with each other and insulated from each other;
a planarization layer, arranged on a side of the plurality of gate lines and the plurality of data lines away from the first base substrate, and comprising a first via hole;
a supporting structure, arranged on a side of the planarization layer away from the first base substrate and filled into the first via hole, wherein in a direction perpendicular to the first base substrate, a height of the supporting structure is greater than a depth of the first via hole; and
a first light-shielding structure arranged between a layer where the plurality of gate lines are located and the first base substrate;
wherein a surface of a side of the supporting structure away from the first base substrate is a first surface, the first surface is of a curved-surface structure, a vertical height difference range between a maximum distance and a minimum distance between the first surface and the first base substrate is a, and 0<|a|≤1 μm;
orthographic projections of the plurality of gate lines on the first base substrate and orthographic projections of the plurality of data lines on the first base substrate have a plurality of overlapping regions, and at least part of the overlapping regions are respectively located in an orthographic projection of a corresponding first via hole on the first base substrate;
an orthographic projection of the first light-shielding structure on the first base substrate at least covers the orthographic projection of the first via hole outside a corresponding overlapping region on the first base substrate.

2. The display substrate according to claim 1, further comprising a first electrode arranged between the planarization layer and a layer where the supporting structure is located, an adapting electrode arranged between the planarization layer and a layer where the plurality of data lines are located, and a filling structure arranged on a same layer as the supporting structure; wherein
the planarization layer further comprises a second via hole, the first electrode is connected with the adapting electrode through the second via hole, and the filling structure fills the second via hole.

3. The display substrate according to claim 2, wherein in a cross section perpendicular to the first base substrate, a difference between a maximum radial dimension of the supporting structure and a maximum radial dimension of the filling structure is greater than or equal to 0 μm and smaller than or equal to 5 μm.

4. The display substrate according to claim 2, wherein in the cross section perpendicular to the first base substrate, a difference between a maximum radial dimension of the first via hole and a maximum radial dimension of the second via hole is greater than or equal to 2 μm and smaller than or equal to 9 μm.

5. The display substrate according to claim 2, wherein in the direction perpendicular to the first base substrate, the depth of the first via hole is greater than a depth of the second via hole.

6. The display substrate according to claim 2, wherein in the cross section perpendicular to the first base substrate, a shortest distance $S_1$ between the first via hole and the second via hole is greater than or equal to 2 μm and smaller than or equal to 5 μm, and a longest distance $S_2$ between the first via hole and the second via hole is equal to $(S_1+h_1*\cot \beta+h_2*\cot \gamma)$, wherein $h_1$ is the depth of the first via hole in the direction perpendicular to the first base substrate, $\beta$ is an angle of gradient of the planarization layer at the first via hole, $h_2$ is the depth of the second via hole in the direction perpendicular to the first base substrate, and $\gamma$ is an angle of gradient of the planarization layer at the second via hole.

7. The display substrate according to claim 2, further comprising a transistor arranged between a layer where the adapting electrode is located and the first base substrate, wherein the transistor comprises a gate, and at least part of an orthographic projection of the second via hole on the first base substrate is located in an orthographic projection of the gate on the first base substrate.

8. The display substrate according to claim 7, further comprising a second light-shielding structure arranged between a layer where the gate is located and the first base substrate;
wherein the transistor comprises an active layer disposed between the layer where the gate is located and a layer where the second light-shielding structure is located, the active layer comprises a channel region, and an orthographic projection of the channel region on the first base substrate is located in an orthographic projection of the second light-shielding structure on the first base substrate.

9. The display substrate according to claim 8, wherein the first light-shielding structure and the second light-shielding structure are arranged on a same layer, the first light-shielding structure and the second light-shielding structure are independent of each other, or one first light-shielding structure and an adjacent second light-shielding structure are integrated.

10. The display substrate according to claim 2, further comprising a connecting structure arranged on a same layer as the supporting structure and the filling structure, wherein the connecting structure is arranged between the supporting structure and the filling structure and is integrated with the supporting structure and the filling structure; and
a distance between a surface of a side of the connecting structure away from the first base substrate and the first base substrate is greater than a distance between a surface of a side of the supporting structure or the filling structure away from the first base substrate and the first base substrate.

11. The display substrate according to claim 2, further comprising a second electrode arranged on a side, away from the planarization layer, of the layer where the first electrode is located.

12. A display panel, comprising: a display substrate and an opposite substrate which are arranged oppositely, wherein the display substrate is the display substrate according to claim 1, the opposite substrate comprises a second base substrate, and a spacer arranged on a side of the second base substrate facing the display substrate, and an end of a side of the spacer facing the display substrate is arranged in a concave portion of the supporting structure.

13. A display apparatus, comprising the display panel according to claim 12.

* * * * *